United States Patent
Emerfoll

(10) Patent No.: US 6,655,437 B1
(45) Date of Patent: Dec. 2, 2003

(54) QUILT HEAT BONDING SYSTEM

(76) Inventor: Mona Lou M. Emerfoll, 2638 Oak Hill Ct., Maplewood, MN (US) 55119

( * ) Notice: Subject to any disclaimer, the term of this patent is extended or adjusted under 35 U.S.C. 154(b) by 62 days.

(21) Appl. No.: 10/078,141

(22) Filed: Feb. 19, 2002

(51) Int. Cl.[7] ............................................. B30B 15/00
(52) U.S. Cl. .................. 156/579; 156/583.1; 156/583.8
(58) Field of Search ................. 156/579, 580, 156/581, 583.1, 583.8, 583.9

(56) References Cited

U.S. PATENT DOCUMENTS

| | | | |
|---|---|---|---|
| 2,711,469 A | * 6/1955 | Southam et al. | 219/21 |
| 2,759,090 A | * 8/1956 | Frye | 219/21 |
| 3,200,028 A | * 8/1965 | Chisholm | 156/499 |
| 3,853,595 A | 12/1974 | Pedginski et al. | |
| 4,426,945 A | 1/1984 | A-Yan | |
| 4,758,297 A | 7/1988 | Calligarich | |
| 5,141,586 A | * 8/1992 | Myers et al. | 156/358 |
| 5,458,730 A | * 10/1995 | Soodak | 156/579 |
| 5,459,895 A | 10/1995 | Kikuchi et al. | |
| 5,483,713 A | 1/1996 | Kikuchi et al. | |
| 5,727,458 A | 3/1998 | Schulz | |
| 5,958,802 A | 9/1999 | Wilson | |
| 6,261,397 B1 | 7/2001 | Repp et al. | |

* cited by examiner

*Primary Examiner*—James Sells
(74) *Attorney, Agent, or Firm*—John D. Gugliotta

(57) ABSTRACT

A quilt heat bonding apparatus is provided to aid in the assembly of quilts when used in conjunction with STITCH WITCHERY(™) to produce quilts via a heat fusing process. A handle with a power cord and a control switch that accepts round heating elements of various diameters. The heating elements. vary in size from approximately one inch to two inches. A quilt would be assembled in five layers with the top quilt on top, followed by a layer of STITCH WITCHERY (™), then the batting, then another layer of STITCH WITCHERY(™), and finally the quilt backing. Various sizes of heating elements would be used on various types and sizes of quilts and the final intended use.

5 Claims, 2 Drawing Sheets

QUILT HEAT BONDING SYSTEM

RELATED APPLICATIONS

The present invention was first described in Disclosure Document by Registration 499,392 filed on Sep. 4, 2001 under 35 U.S.C. §122 and 37 C.F.R. §1.14, but not yet returned. There are no previously filed, nor currently any co-pending applications, anywhere in the world.

BACKGROUND OF THE INVENTION

1. Field of the Invention

The present invention relates generally to devices and methods for attaching layers of fabric and, more particularly, to an apparatus and method for affixing multiple layers of material at the same time in varying patterns utilizing thermal activated adhesives.

2. Description of the Related Art

The hobby of quilting has remained popular throughout time. Not only do many people find it relaxing and enjoyable, but the resulting quilts are beautiful, valuable and functional. One popular method of producing quilts uses a product called STITCH WITCHERY(™) to bind the various layers of the quilt together. STITCH WITCHERY(™) is a polyamide fusible web that permanently bonds two layers of fabric together with the application of heat. STITCH WITCHERY(™) keeps the batting on the interior of the quilt from bunching up thus allowing the quilt to remain beautiful even when hung in a horizontal position. The STITCH WITCHERY(™) is usually activated by an iron, but the large surface area of the iron causes the quilt to flatten out making it lose the random thickness that gives the quilt its fluffy look.

A search of the prior art did not disclose any patents that read directly on the claims of the instant invention; however, the following references were considered related.

U.S. Pat. No. 3,853,595, issued in the name of Pedginski et al, describes a sewing tape which can be adhered to fabric.

U.S. Pat. No. 4,426,945, issued in the name of A-Yan, describes a method for manufacture of feather quilt.

U.S. Pat. No. 4,758,297, issued in the name of Calligarich, describes a hot pin laminated fabric.

U.S. Pat. No. 5,459,895, issued in the name of Kikuchi et al, describes a method of bonding fabric materials together into an integral structure.

U.S. Pat. No. 5,483,713, issued in the name of Kikuchi et al, describes a method of bonding fabric materials together.

U.S. Pat. No. 5,727,458, issued in the name of Schulz, describes an apparatus and method for contour embossing with perforation bonding.

U.S. Pat. No. 5,958,802, issued in the name of Wilson, describes a webbing that has been coated with a pressure sensitive adhesive.

U.S. Pat. No. 6,261,397, issued in the name of Repp et al, describes a method of making a quilt including a heat activated adhesive coating.

Consequently, a need has been felt for providing an apparatus and method of Accordingly, there is a need for a means by which one can activate STITCH WITCHERY(™) with the application of heat in a manner without the disadvantages as described above. SUMMARY OF THE INVENTION It is therefore an object of the present invention to provide an improved device and method for attaching layers of fabric.

It is a feature of the present invention to provide an improved apparatus and method for affixing multiple layers of material at the same time in varying patterns utilizing thermal activated adhesives.

Briefly described according to one embodiment of the present invention, an apparatus to aid in the assembly of quilts is provided. The invention is used in conjunction with STITCH WITCHERY(™) to produce quilts via a heat fusing process. The invention consists primarily of a handle with a power cord and a control switch that accepts round heating elements of various diameters. The heating elements vary in size from approximately one inch to two inches. A quilt would be assembled in five layers with the top quilt on top, followed by a layer of STITCH WITCHERY(™), then the batting, then another layer of STITCH WITCHERY(™), and finally the quilt backing. The invention is then used to fuse the STITCH WITCHERY(™) to the adjoining pieces to form a continuous and solid piece. The small size of the invention ensures that the quilt will retain its random thickness, thus producing a quilt with the highly desired "fluffiness" trait. The various sizes of heating elements would be used on various types and sizes of quilts and the final intended use.

The use of the quilt heat bonding system provides for the rapid assembly of quilts in a manner which is quick, easy and effective.

When used with STITCH WITCHERY(™) to Make quilts, the present invention uses heat to bond layers of quilt together and functions like a small iron in a portable manner.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
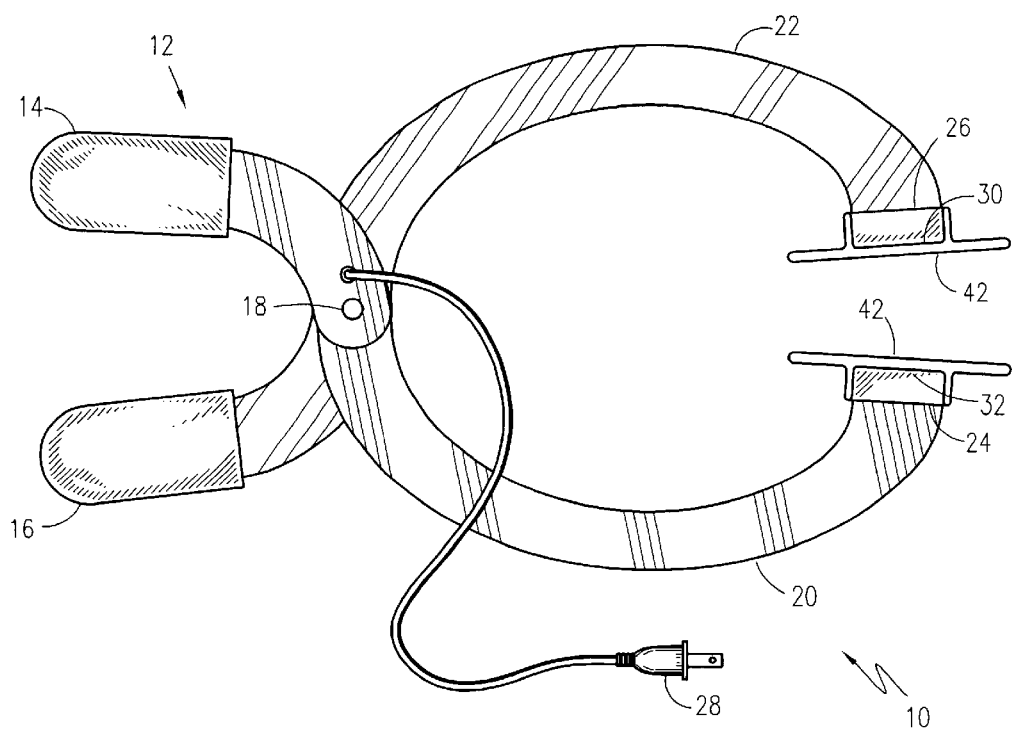
FIG. 1 is an elevational view of a quilt-heat bonding apparatus according to the preferred embodiment of the present invention.
Figure 2:
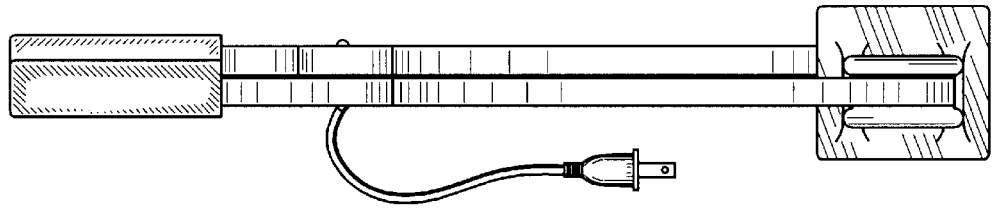
FIG. 2 is a plan view thereof.

Referring now to FIG. 1, a quilt heat bonding apparatus 10 is shown, according to the present invention, having an articulating handle 12 formed of an upper handle element 14 opposed to a lower handle element 16 affixed together by a spring urged hinge 18. The upper handle element 14 is mechanically affixed to a lower extension arm 20. The lower handle element 16 is mechanically affixed to an upper extension arm 22. The lower extension arm 20 is formed in an upwardly arcuate shape and terminating at a first attachment means 24. The upper extension arm 22 is formed in an lower arcuate shape and terminating at a second attachment means 26. An electrical power supply, shown herein as an electrical power cord 28 extends form the handle 12 and is in electrical communication with heating elements located at said first attachment end 24 and second attachment end 26, respectively. A heat transfer surface 30, 32 respectively terminates each attachment end 24, 26.

The ironing plates 40 are further provided for replaceable attachment to each attachment end 24, 26. Each pair of plates 40 vary in size from approximately one inch to two inches and provide various heating surfaces 42. Being in thermal communication with the heat transfer surface 30 or 32, the ironing plate 40 conducts heat-to the heating surface 42 where it functions similar to a small iron.

2. Operation of the Preferred Embodiment

Figure 3:
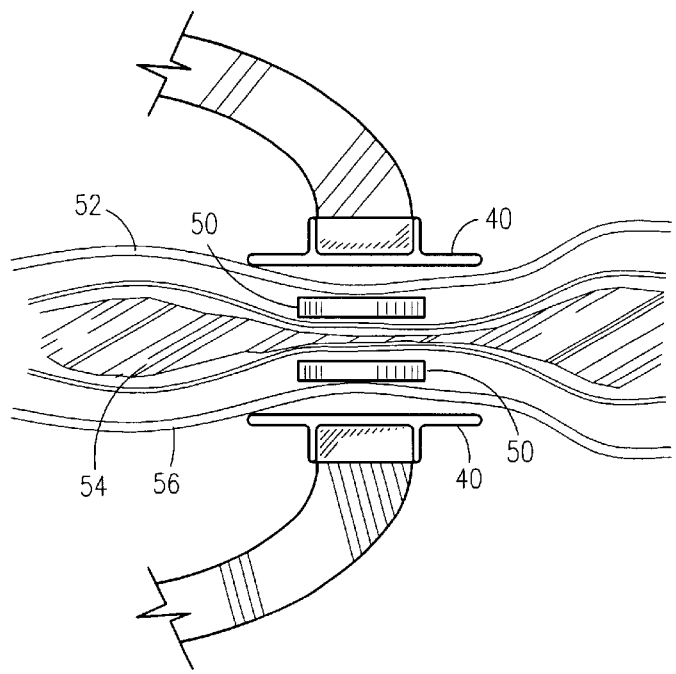
FIG. 3 is a cross sectional view of a quilt segment shown using the preferred embodiment of the present invention.

In accordance with a preferred embodiment of the present invention, as shown in FIG. 3 the apparatus 10 is used in conjunction with STITCH WITCHERY(™) 50 to produce quilts via a heat fusing process. A quilt would be assembled in five layers with the top quilt 52 on top, followed by a layer of STITCH WITCHERY(™) 50, then the batting 54, then another layer of STITCH WITCHERY(™) 50, and finally the quilt backing 56. The invention is then used to fuse the STITCH WITCHERY(™) to the adjoining pieces to form a continuous and solid piece. The small size of the invention ensures that the quilt will retain its random thickness, thus producing a quilt with the highly desired "fluffiness" trait.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A quilt heat bonding apparatus comprising:

an articulating handle formed of an upper handle element opposed to a lower handle element affixed together by a spring urged hinge;

a lower extension am mechanically affixed to said upper handle element;

an upper extension arm mechanically affixed to said lower handle element;

said lower extension arm formed in an upwardly arcuate shape and terminating at a first attachment means;

said lower extension arm formed in an lower arcuate shape and terminating at a second attachment means;

an electrical power supply extending from said handle; and heating elements located at a first attachment end terminating, said first attachment means and a second attachment end terminating said second attachment means, respectively, wherein each said pair of plates vary in size from approximately one inch to two inches and provide various heating surfaces.

2. The quilt heat bonding apparatus of claim 1, wherein said heating elements are in electrical communication with said electrical power supply.

3. The quilt heat bonding apparatus of claim 1, further comprising a heat transfer surface terminating each said attachment end.

4. The quilt heat bonding apparatus of claim 2, wherein said heating elements are further provided for replaceable attachment to each said attachment end.

5. The quilt heat bonding apparatus of claim 4, further comprising a plurality of pairs of heating plates, each said pair varying in size.

\* \* \* \* \*